United States Patent
Zami et al.

(10) Patent No.: US 7,389,047 B2
(45) Date of Patent: Jun. 17, 2008

(54) OPTICAL RING TRANSMISSION NETWORK

(75) Inventors: Thierry Zami, Massy (FR); Arnaud Dupas, St-Michel-sur-Orge (FR)

(73) Assignee: Alcatel, Paris (FR)

( * ) Notice: Subject to any disclaimer, the term of this patent is extended or adjusted under 35 U.S.C. 154(b) by 529 days.

(21) Appl. No.: 11/061,595

(22) Filed: Feb. 22, 2005

(65) Prior Publication Data

US 2005/0185960 A1 Aug. 25, 2005

(30) Foreign Application Priority Data

Feb. 23, 2004 (FR) .................................. 04 50327

(51) Int. Cl.
*H04B 10/20* (2006.01)
(52) U.S. Cl. ............................ 398/59; 398/83; 398/79; 398/58; 398/82; 398/84; 398/85; 398/91; 398/100; 398/99; 398/147; 398/148; 398/149; 398/158; 398/159; 398/66; 398/67; 398/68; 398/69; 398/70; 398/71; 398/72; 385/24; 385/37
(58) Field of Classification Search .................. 398/83, 398/59, 79, 82, 84, 85, 91, 100, 66, 67, 68, 398/69, 70, 71, 72, 147, 148, 149, 158, 159, 398/58; 385/24, 37
See application file for complete search history.

(56) References Cited

U.S. PATENT DOCUMENTS 5,712,717 A 1/1998 Hamel et al.
5,745,269 A * 4/1998 Chawki et al. ............... 398/59
7,106,969 B1 * 9/2006 Lichtman et al. ............. 398/59

FOREIGN PATENT DOCUMENTS

EP 0 967 752 A 12/1999
EP 1 372 281 A 12/2003

\* cited by examiner

*Primary Examiner*—Hanh Phan
(74) *Attorney, Agent, or Firm*—Sughrue Mion, PLLC

(57) ABSTRACT

The network comprises an optical ring link (F) and a concentrator (HUB) that sends via one end of the link "downlink" optical signals carried by respective wavelengths and receives "uplink" optical signals via the other end of the link. The link is divided into a plurality of segments (FS1-FS4) separated by access nodes (AN1-AN3) for receivers (RX) of downlink optical signals and for senders (TX) of uplink optical signals. Each access node comprises coupling means that are not wavelength-selective for coupling the segment on the upstream side of the node to the segment on the downstream side and to the receivers and to couple the senders (TX) to the segment on the downstream side. The downlink optical signals are carried by wavelengths belonging to a set of predefined wavelengths. To optimize the use of spectral resources, a rejection filter (NF) is inserted into a segment to reject a portion of the wavelengths of said set of wavelengths. The senders (TX) of stations associated with nodes on the downstream side of the segment then adapted produce uplink optical signals carried by respective wavelengths rejected by the rejection filter (NF). The invention is applicable to optical metropolitan access networks in particular.

7 Claims, 1 Drawing Sheet

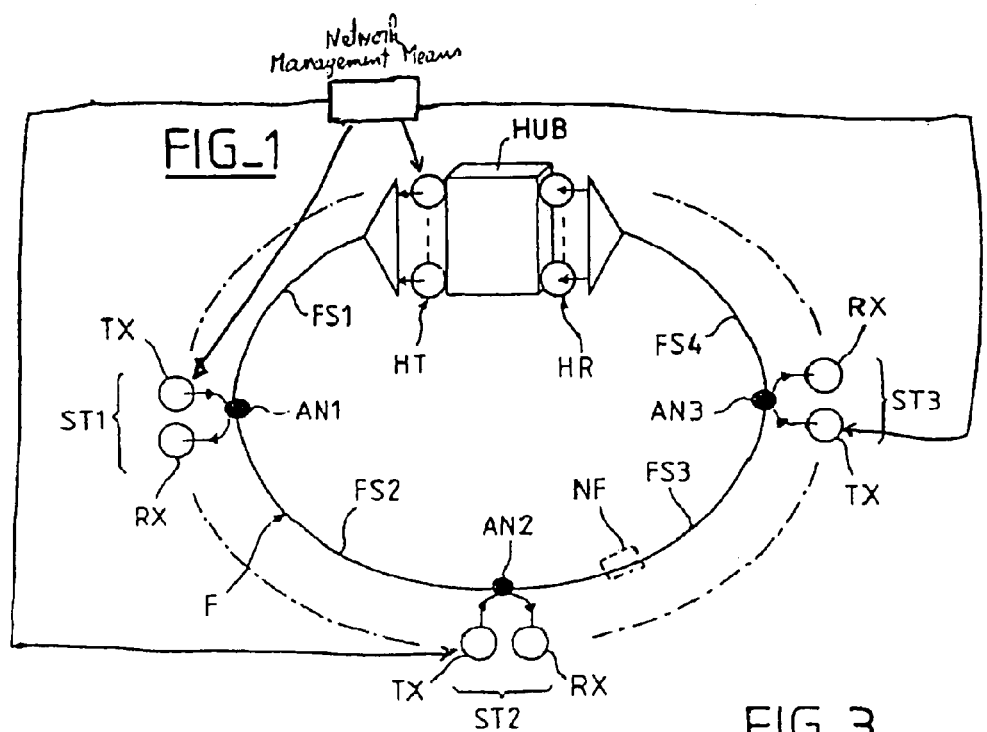
FIG_1
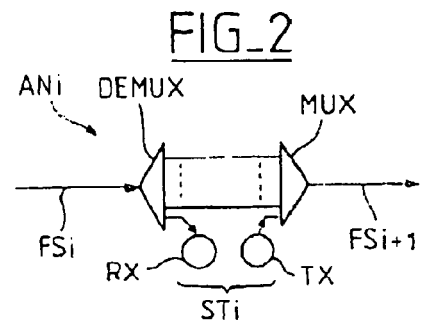
FIG_2
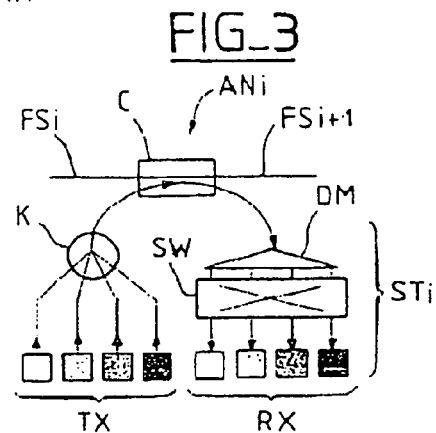
FIG_3
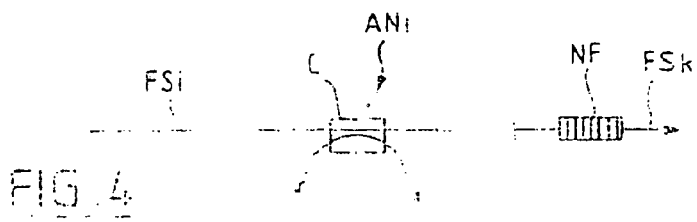
FIG_4

OPTICAL RING TRANSMISSION NETWORK

FIELD OF THE INVENTION

The field of the invention is that of transmission networks that use optical links. The invention relates more particularly to optical networks that are suited to relatively restricted geographical areas, such as metropolitan access networks.

BACKGROUND OF THE INVENTION

An optical network generally comprises a plurality of stations able to send and receive optical signals to and from other stations of the network. Information is exchanged by means of optical links to which access nodes serving respective stations are connected.

The wavelength-division multiplexing (WDM) technique is advantageously used to exploit the bandwidth capacity of these optical links. Accordingly, the optical links convey multiplex signals that are formed from a combination of optical signals each consisting of an optical carrier wave modulated as a function of the information to be sent. Each carrier wave has a specific wavelength that defines a corresponding channel.

Moreover, if the network is sufficiently small, devices for regenerating the channels individually may be dispensed with. A network of this kind is referred to as "transparent" and may nevertheless comprise optical amplifiers to amplify simultaneously the channels of the transmitted WDM multiplexes.

The invention applies to a type of transparent WDM network that uses a ring configuration. The network then comprises an optical link which has one end coupled to a send interface of a concentrator (also known as a "hub") and its other end coupled to a receive interface of the same concentrator. The concentrator normally also communicates with an external interconnection network.

FIG. 1 is a diagram that represents one example of a network of the simplest kind. In this example, the looped link consists of a fiber F to which access nodes AN1-AN3 for send terminals TX and receive terminals RX of associated stations ST1-ST3 are connected. The optical link is made up of a plurality of fiber segments FS1-FS4 separated by nodes and possibly by optical amplifiers (not shown). The link has a first end, called the upstream end, connected to the send interface HT of the concentrator HUB and a second end, called the downstream end, connected to the receive interface HR of the concentrator.

The send interface HT comprises a plurality of senders using carrier waves at different send wavelengths. Each station also includes a wavelength-selective receiver. Accordingly, each sender of the concentrator can inject a signal of given wavelength into the link, and when that signal reaches an access node via the fiber it can be acted on by the associated station if one of its receivers is tuned to that wavelength.

Conversely, the receive interface HR of the concentrator comprises a plurality of different wavelength-selective receivers and each station includes a sender TX that sends at a given send wavelength. Accordingly, a sender of a station can inject a signal of given wavelength into the link and when that signal reaches the receive interface it can be acted on by the concentrator if one of its receivers is tuned to that wavelength. However, to prevent interference and conflicts at the level of the receive interface, it is necessary for all the send wavelengths of the various stations to be different from each other.

It should be noted that, given the bandwidth of the link, each station could in practice comprise a plurality of receivers and a plurality of senders tuned to a plurality of wavelengths.

Accordingly, signals sent by the concentrator and carried by respective wavelengths are routed to destination stations having respective receivers tuned to those wavelengths.

The signals coming from the concentrator then constitute what is referred to as "downlink" information traffic on the link.

Information is exchanged between the stations via the concentrator in the following manner. Each send station sends the concentrator a signal that is carried by one of the receive wavelengths of the concentrator and contains an address indicating the destination station. After reception of the signal and its conversion to electrical form by the concentrator, the network management means use the destination address to determine a receive wavelength of the destination station. The signal is then converted back into optical form on a carrier wave having that wavelength.

The signals coming from the stations then constitute "uplink" information traffic on the link. It should be noted that the uplink and downlink traffic signals are in fact conveyed in the same "upstream to downstream" direction, i.e. in the direction of propagation of the signals from the senders of the concentrator or the stations to the downstream end of the fiber.

Add-drop multiplexers are routinely used to implement access nodes. Their function is to drop from a received multiplex the channels that have the reserved receive wavelengths of the station concerned.

FIG. 2 is a diagram of one embodiment of this kind of add-drop multiplexer for an access node ANi of a station STi (with i=1 to 3).

It includes a demultiplexer DEMUX having one input and multiple outputs and a multiplexer MUX having multiple inputs and one output. The outputs of the demultiplexer are tuned to non-adjacent wavelength bands and the inputs of the multiplexer are tuned to the same wavelength bands, respectively. The combination of these bands cover the whole of the spectrum assigned to the channels of the network. One of the outputs of the demultiplexer is routed to the receivers RX of the station concerned and is therefore used to drop channels whose wavelengths are reserved for reception by the station. Similarly, one of the inputs of the multiplexer is connected to the senders TX of the station concerned and is therefore used to add channels whose wavelengths are reserved for sending by the station. The other outputs of the demultiplexer are coupled to respective homologous inputs of the multiplexer.

As indicated above, a receiver RX is in fact a plurality of wavelength-selective receivers (which are not shown individually in the figure) operating in the band of wavelengths of the drop output of the demultiplexer. Wavelength-selective reception is effected by means of photodetectors preceded by respective appropriate filters, for example.

This system ANi is inserted between two successive fiber segments FSi, FSi+1 to receive a multiplex that represents the whole of the traffic reaching the upstream side of the node concerned and to send in the downstream direction a multiplex that is formed of signals of channels that are not dropped and signals sent by the station.

Apart from the fact that this solution based on a multiplexer and a demultiplexer is relatively costly, in particular if there are many bands, it has the drawback of limiting flexibility in respect of the number and choice of send and receive wavelengths that can be assigned to the various stations. This solution implies reserving for each station fixed and identical spectral resources both for dropping and for adding. It may in practice be necessary to provide sending capacities for certain stations that are very different from their receiving capacities. Moreover, good flexibility in the choice of wavelengths allows better adaptation to the changing distribution of traffic between the nodes and the concentrator.

Finally, the access nodes as described above are not well suited to easy and economic evolution of the send and receive capacities of the stations as and when requirements increase. To increase the number of users connected to the nodes, it is necessary to add senders and receivers in the stations. It is therefore also necessary to intervene at link level to replace the add-drop multiplexers by others of greater capacity or to provide in the installation devices that are designed to support a high nominal capacity that is initially greater than is really necessary.

There exist other types of add-drop multiplexers based on rejection filters that may or may not be reconfigurable, such as that described in U.S. Pat. No. 6,038,045, for example. These solutions have analogous limitations from the points of view of flexibility in the choice and number of wavelengths.

To overcome these limitations, it is generally necessary for the node to allow a connection between the link and the associated station that is not wavelength-selective, both for dropping multiplex signals received from the upstream side and for adding signals created in the station to the downstream multiplex. In other words, it is necessary to use simple couplers to sample, without filtering, a portion of the optical power received from the link, and to inject the combination of the send signals of the station into the link without filtering them.

FIG. 3 shows an embodiment conforming to the above principle. Here the node ANi consists simply of a 2-to-2 coupler C. A first input of the coupler is connected to the upstream segment FSi and a first output of the coupler is connected to the downstream segment FSi+1.

The station STi includes a send system consisting of n senders TX (n is equal to 4 in the example shown) whose outputs are connected to corresponding inputs of an n-to-1 coupler K (a 4-to-1 coupler in this example). The output of the coupler K is coupled to the second input of the coupler C. The station STi also includes a receive system comprising a demultiplexer DM having an input coupled to the second output of the coupler C and m outputs coupled to m photodetectors RX (there are four photodetectors in the example shown) via an m x m space switch SW (a 4×4 switch in this example).

Accordingly, the two adjacent segments FSi, FSi+1 are connected to each other by a first channel of the coupler C, the upstream segment FSi is connected to the receive system by a second channel and the send system is connected to the downstream segment FSi+1 by a third channel, these three channels providing connections that are not wavelength selective.

Consequently, by providing wavelength-tunable senders TX, each sender can add into the downstream segment a signal carried by any wavelength and there is no limit on the number of senders.

Similarly, by means of the switch SW, each photodetector can receive any of the channels dropped by the demultiplexer DM. The effective receive capacity is determined by the number of photodetectors used, within an overall limit set by the size of the demultiplexer DM, and can evolve easily by adding photodetectors and/or installing a larger demultiplexer DM, without disturbing traffic in transit via the node. Note that a plurality of stations can process the same channel, to allow broadcasting of the send signal to a plurality of receivers in different stations.

That solution provides great flexibility in choosing send and receive wavelengths. That choice is nevertheless limited by several conditions.

As is the case in the preceding solutions, the send wavelengths used simultaneously by all of the stations must all be different, of course.

Any station send wavelength must also be different from any concentrator send wavelength, a condition that leads to defining within the set of wavelengths usable in the network (for example band C of the ITU standard) two non-adjacent subsets of wavelengths respectively grouping wavelengths reserved to the senders of the concentrator and wavelengths reserved to the senders of the stations, i.e. to subsets of channel wavelengths respectively assigned to downlink and uplink traffic.

Now, if the evolution of the use of channels along the link, starting from its upstream end (at the output of the send interface of the concentrator), is statistically analyzed, it is found that the number of wavelengths of the concentrator that continue to be useful decreases on moving from node to node in the downstream direction, i.e. on approaching the receive interface of a concentrator.

This means that the set of spectral resources of the network is not used optimally.

BRIEF SUMMARY OF THE INVENTION

Given the foregoing remarks, one object of the invention is to optimize the use of spectral resources in the above kind of network. To this end, the invention consists in an optical transmission network comprising a ring optical link and a concentrator having a send interface and a receive interface, wherein a first, upstream end of said link is connected to said send interface and a second, downstream end of said link is connected to said receive interface, the send interface comprises optical senders that produce "downlink" optical signals carried by respective wavelengths, the receiver interface comprises optical receivers that detect "uplink" optical signals coming from said second end, said link is subdivided into a plurality of segments separated by access nodes for optical receivers and optical senders of associated stations, said station senders produce said uplink optical signals carried by respective wavelengths, said optical receivers detect downlink optical signals selectively as a function of their respective wavelengths, each access node comprises coupling means that couple any optical signal coming from the segment on the upstream side of the node to the segment on the downstream side of the node and to the receivers of the associated station and to couple any optical signal coming from said senders of the associated station to the segment on the downstream side of the node, which couplings are not wavelength-selective, and said downlink optical signals are carried by wavelengths belonging to a first set of predefined wavelengths, which network is characterized in that a rejection filter is inserted into a segment of said link between two adjacent nodes, said rejection filter rejects a portion of the wavelengths of said first set, and optical senders of stations associated with nodes on the downstream side of said segment produce uplink optical signals carried by respective wavelengths rejected by said rejection filter.

The advantage of this solution is that the total number of wavelengths usable by the network is increased since certain of the wavelengths initially assigned to downlink traffic at the output of the send interface of the concentrator may be used again for uplink traffic on the downstream side of a filter that rejects those wavelengths.

Moreover, even if the introduction of filters limits certain choices of wavelengths for carrying downlink traffic, flexibility is improved in respect of the overall number of wavelengths that may be assigned within the network.

BRIEF DESCRIPTION OF THE DRAWINGS

Other aspects and advantages of the invention become apparent in the description below, which refers to the drawings.

FIG. 1, commented on above, shows one example of a metropolitan access network to which the invention may be applied.

FIG. 2, commented on above, shows one embodiment of a prior art access node.

FIG. 3, commented on above, shows one embodiment of an access node that may be used in a network to which the invention applies with advantage.

FIG. 4 is a diagram of one embodiment of the invention.

DETAILED DESCRIPTION OF THE EMBODIMENTS

Given the foregoing explanations, the practical implementation of the invention raises no particular problems. As shown diagrammatically in FIG. 4, it simply consists in inserting into one or more fiber segments FSk rejection filters NF tuned to certain of the wavelengths belonging to the set of wavelengths reserved for the sending of signals by the concentrator. These filters may use various available technologies (for example they may be filters using a Bragg grating written in a fiber).

For good use of spectral resources, it is necessary to provide a plurality of rejection filters NF for rejecting respective non-adjacent bands of wavelengths.

For cost reasons, it is preferable to use standard continuous band rejection filters, which implies that the wavelengths reserved for sending of signals by the concentrator are preferably adjacent and that the rejection bands of the filters also cover adjacent wavelengths.

The management and control of the tunable sources of the stations could additionally be simplified in the following manner.

The wavelengths reserved for the sending of signals by the concentrator constitute a first set of predefined adjacent wavelengths such that the downlink optical signals are carried by wavelengths belonging to the first set. A second set of predefined adjacent wavelengths is chosen such that the senders TX of the station nearest the upstream end of the link are able to produce uplink optical signals carried by wavelengths belonging to the second set. The first and second sets are then chosen so that they constitute respective adjacent wavelength bands. In this case, the rejection filters disposed along the link comprise P filters numbered from 1 to P in increasing number order in the direction from the upstream end to the downstream end of the link; for any number q from 1 to P−1, the filters q and q+1 are chosen to reject adjacent bands of wavelengths.

This way of organizing wavelengths and the rejection bands of the filters minimizes the tuning ranges to be provided for the senders of the stations.

The number of filters to be provided and the number of channels rejected by the respective filters in fact depend on the traffic characteristics of the network concerned.

One particular instance is that in which the send and receive traffic of each station are assumed to be balanced. The following is one possible dimensioning rule for use in the situation where one filter is provided per segment.

If N is the number of nodes of the network, M is the total number of channels provided in the network, and the first station is able to send on X wavelengths, the first set of wavelengths that may be assigned to downlink traffic could comprise up to M−X wavelengths at the output of the concentrator.

The hypothesis of balanced send and receive traffic requires that each filter reject the same number dM of wavelengths and that the concentrator after the last station be able to receive M−X wavelengths. From this it may be deduced that:

$$M-X=X+(N-1)cM, \text{ whence:}$$

$$dM=(M-2X)/(N-1)$$

Clearly this imposes the condition X<M/2. If the value of dM obtained is not an integer, filters could be chosen in which the numbers of channels rejected are rounded up and down and placed alternately along the link in the upstream to downstream direction.

For example, if M=32, N=9 and X=8, we obtain dM=2 and the following distribution:

|  | Node 1 | Node 2 | Node 3 | Node 4 | Node 5 | Node 6 | Node 7 | Node 8 | Node 9 |
|---|---|---|---|---|---|---|---|---|---|
| Number of downlink traffic channels | 24 | 22 | 20 | 18 | 26 | 14 | 12 | 10 | 8 |
| Number of uplink traffic channels | 8 | 10 | 12 | 14 | 16 | 18 | 20 | 22 | 24 |

Introducing filters naturally has consequences in respect of the choice of wavelengths for conveying uplink and downlink traffic. Also, the network management means normally provided for selecting the wavelengths carrying the downlink and uplink optical signals must take account of this feature.

To maximize flexibility, those means may advantageously also be designed to optimize the choice of wavelengths as a function of the locations of the filters and the wavelengths that they reject, i.e. the numbers of receive and send wavelengths available at each station.

For downlink traffic, if possible, it is first of all desirable to assign the highest priority to choosing a wavelength that is rejected further upstream, so as to leave free the downlink wavelengths going to increasingly downstream nodes for which the choice of wavelengths is inherently more restricted.

Also, according to the invention, if there is a plurality of wavelengths available for carrying a downlink optical signal addressed to a station associated with a given node, the management means select a wavelength that is rejected by the filter on the downstream side of that given node, but as close as possible to upstream end of the link.

In parallel with this, for uplink traffic, if possible, priority is given to choosing a wavelength that has been "freed" of downlink traffic as far downstream as possible, to leave available wavelengths that can be sent as far upstream as possible, where the number of possible wavelengths for uplink traffic is more restricted.

Also, and again in accordance with the invention, if there is a plurality of possible wavelengths for carrying an uplink optical signal produced by a station associated with a given node, the management means select a wavelength rejected by a filter upstream of that given node, although as near the downstream end of the link as possible.

The invention is not limited to the embodiments described hereinabove. In particular, tunable rejection filters could be used to offer additional optimization possibilities, if necessary.

The coupling means C that are not wavelength-selective could be implemented in various ways, but a 2-to-2 directional coupler constitutes a good solution that is advantageous in terms of cost and optical losses.

Of course, the invention may be applied equally as well to passive networks as to networks having links provided with amplifiers.

What is claimed is:

1. An optical transmission network comprising:
    a ring optical link and a concentrator having a send interface and a receive interface, wherein
    a first, upstream end of said link is connected to said send interface and a second, downstream end of said link is connected to said receive interface,
    the send interface comprises optical senders that produce "downlink" optical signals carried by respective wavelengths,
    the receiver interface comprises optical receivers that detect "uplink" optical signals coming from said second end,
    said link is subdivided into a plurality of segments separated by access nodes for optical receivers and optical senders of associated stations,
    said station senders produce said uplink optical signals carried by respective wavelengths,
    said optical receivers detect downlink optical signals selectively as a function of their respective wavelengths,
    each access node comprises coupling means that couple any optical signal coming from the segment on the upstream side of the node to the segment on the downstream side of the node and to the receivers of the associated station and to couple any optical signal coming from said senders of the associated station to the segment on the downstream side of the node, which couplings are not wavelength-selective, and
    said downlink optical signals are carried by wavelengths belonging to a first set of predefined wavelengths,
    wherein said network further comprises a rejection filter is inserted into a segment of said link between two adjacent nodes, said rejection filter rejects a portion of the wavelengths of said first set, and optical senders of stations associated with nodes on the downstream side of said segment produce uplink optical signals carried by respective wavelengths rejected by said rejection filter.

2. A network according to claim 1, further comprising a plurality of rejection filters that reject respective non-adjacent bands of wavelengths.

3. A network according to claim 2, wherein the wavelengths of said first set are adjacent and in that said bands cover adjacent wavelengths.

4. A network according to claim 3, wherein the senders of the station nearest the upstream end of the link produce uplink optical signals carried by wavelengths belonging to a second set of predefined adjacent wavelengths, said first and second sets constitute respective adjacent bands of wavelengths, and there are P rejection filters disposed along the link numbered from 1 to P in increasing order from the upstream end to the downstream end of the link, for any number q from 1 to P-1, the filters q and q+1 rejecting adjacent bands of wavelengths;
    wherein P is at least 1.

5. A network according to claim 2, comprising network management means for selecting the wavelengths carrying said downlink optical signals, wherein, if there is a plurality of wavelengths available to carry a downlink optical signal addressed to a station associated with a given node, said management means select a wavelength rejected by a filter on the downstream side of said given node but situated as close as possible to the upstream end of said link.

6. A network according to claim 2, comprising network management means for selecting the wavelengths carrying said uplink optical signals, wherein if there is a plurality of wavelengths available to carry an uplink optical signal produced by a station associated with a given node, said management means select a wavelength rejected by a filter on the upstream side of said given node but situated as close as possible to the downstream end of said link.

7. A network according to claim 1, wherein said coupling means that are not wavelength-selective consist of a 2-to-2 directional coupler.

* * * * *